United States Patent
Engle

(10) Patent No.: US 7,331,678 B2
(45) Date of Patent: *Feb. 19, 2008

(54) METHOD AND SYSTEM FOR A THERMAL ARCHITECTURE AND USER ADJUSTABLE KEYSTONE IN A DISPLAY DEVICE

(75) Inventor: Timothy Scott Engle, Tualatin, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/435,215

(22) Filed: May 15, 2006

(65) Prior Publication Data

US 2006/0203334 A1   Sep. 14, 2006

Related U.S. Application Data

(62) Division of application No. 10/644,232, filed on Aug. 19, 2003, now Pat. No. 7,080,910.

(51) Int. Cl.
G03B 21/16 (2006.01)
G03B 21/14 (2006.01)
G03B 21/28 (2006.01)
A47B 97/04 (2006.01)
G02B 7/182 (2006.01)

(52) U.S. Cl. .......................... 353/60; 353/61; 353/69; 353/70; 353/78; 353/98; 353/119; 248/447; 359/872

(58) Field of Classification Search ................ 353/57, 353/60, 61, 74, 77, 78, 101, 102, 119, 98, 353/69, 70; 348/748, 836; 248/447; 359/872; 352/146

See application file for complete search history.

(56) References Cited

U.S. PATENT DOCUMENTS

| 3,485,165 | A | 12/1969 | Hughes |
| 3,712,707 | A | 1/1973 | Henkes, Jr. |
| 4,674,836 | A | 6/1987 | Yata et al. |
| 4,729,631 | A | 3/1988 | Takahashi et al. |
| 4,730,897 | A | 3/1988 | McKechnie et al. |
| 4,773,731 | A | 9/1988 | Goldenberg et al. |
| 4,880,292 | A | 11/1989 | Kageyama |
| 4,921,330 | A | 5/1990 | Takahashi et al. |

(Continued)

FOREIGN PATENT DOCUMENTS

JP   119283   5/1993

OTHER PUBLICATIONS

Kanayama et al. "A New LC Rear-Projection Display Based on the Aspherical Mirror Projection System." IDW. Osaka, Japan: SANYO Electric Co., 2000. 1041-1044.

(Continued)

*Primary Examiner*—Melissa Jan Koval
(74) *Attorney, Agent, or Firm*—Alleman Hall McCoy Russell & Tuttle LLP

(57) ABSTRACT

A rear projection display device. The display device includes a screen and a base to which the screen is mounted. The base includes a plurality of vents to allow air to flow in and out of the base, a heat source, and an air movement device to move air from near the screen, past the heat source, and out through the vents.

17 Claims, 5 Drawing Sheets

U.S. PATENT DOCUMENTS

| | | | |
|---|---|---|---|
| 4,927,248 | A | 5/1990 | Sakakibara et al. |
| 4,936,657 | A | 6/1990 | Tejima et al. |
| 4,979,801 | A | 12/1990 | Park |
| RE33,795 | E | 1/1992 | Ogino |
| 5,100,222 | A | 3/1992 | Minoura et al. |
| 5,302,983 | A | 4/1994 | Sato et al. |
| 5,422,691 | A | 6/1995 | Ninomiya et al. |
| 5,442,413 | A | 8/1995 | Tejima et al. |
| 5,442,484 | A | 8/1995 | Shikawa |
| 5,489,940 | A | 2/1996 | Richardson et al. |
| 5,495,306 | A | 2/1996 | Shibazaki |
| 5,699,131 | A | 12/1997 | Aoki et al. |
| 5,710,668 | A | 1/1998 | Gohman et al. |
| 5,716,118 | A | 2/1998 | Sato et al. |
| 5,724,195 | A | 3/1998 | Enomoto et al. |
| 5,760,973 | A | 6/1998 | Kawamura |
| 5,796,528 | A | 8/1998 | Mihara |
| 5,805,359 | A | 9/1998 | Yamanashi |
| 5,818,639 | A | 10/1998 | Furuya |
| 5,820,240 | A | 10/1998 | Ohzawa |
| 5,833,339 | A | 11/1998 | Sarayeddine |
| 5,870,234 | A | 2/1999 | Ebbesmeier nee Schitthof |
| 5,923,479 | A | 7/1999 | Nagata |
| 5,978,051 | A | 11/1999 | Gohman et al. |
| 5,999,332 | A | 12/1999 | Ohna |
| 6,016,229 | A | 1/2000 | Suzuki |
| 6,018,425 | A | 1/2000 | Nakabayashi et al. |
| 6,038,085 | A | 3/2000 | Nakazawa |
| 6,046,859 | A | 4/2000 | Raj |
| 6,052,226 | A | 4/2000 | Takahashi |
| 6,053,615 | A | 4/2000 | Peterson et al. |
| 6,081,380 | A | 6/2000 | Ohshima et al. |
| 6,084,707 | A | 7/2000 | Maruyama et al. |
| 6,088,172 | A | 7/2000 | Sato |
| 6,111,702 | A | 8/2000 | Nalwa |
| 6,123,425 | A | 9/2000 | Ohzawa |
| 6,129,552 | A | 10/2000 | Deshoux et al. |
| 6,137,638 | A | 10/2000 | Yamagishi et al. |
| 6,144,503 | A | 11/2000 | Sugano |
| 6,147,812 | A | 11/2000 | Narimatsu et al. |
| 6,188,523 | B1 | 2/2001 | Choi |
| 6,201,647 | B1 | 3/2001 | Ohzawa |
| 6,236,511 | B1 | 5/2001 | Brown |
| 6,273,338 | B1 | 8/2001 | White |
| 6,299,313 | B1 | 10/2001 | Hirata et al. |
| 6,301,058 | B2 | 10/2001 | Nagahara |
| 6,307,675 | B1 | 10/2001 | Abe et al. |
| 6,348,993 | B1 | 2/2002 | Hori |
| 6,353,509 | B1 | 3/2002 | Nakazawa |
| 6,366,400 | B1 | 4/2002 | Ohzawa |
| 6,384,987 | B1 | 5/2002 | Serisui |
| 6,396,641 | B2 | 5/2002 | Hirata et al. |
| 6,400,504 | B2 | 6/2002 | Miyata |
| 6,406,150 | B1 | 6/2002 | Burstyn |
| 6,407,859 | B1 | 6/2002 | Hennen et al. |
| 6,407,860 | B1 | 6/2002 | Funazaki et al. |
| 6,416,181 | B1 | 7/2002 | Kessler et al. |
| 6,417,966 | B1 | 7/2002 | Moshrefzadeh et al. |
| 6,419,365 | B1 | 7/2002 | Potekev et al. |
| 6,471,359 | B1 | 10/2002 | Kim et al. |
| 6,473,236 | B2 | 10/2002 | Tadic-Galeb et al. |
| 6,485,145 | B1 | 11/2002 | Cotton et al. |
| 6,493,032 | B1 | 12/2002 | Wallerstein et al. |
| 6,513,935 | B2 | 2/2003 | Ogawa |
| 6,533,421 | B2 * | 3/2003 | Ono ............................ 353/61 |
| 6,561,649 | B1 | 5/2003 | Burstyn |
| 6,624,952 | B2 | 9/2003 | Kuwa et al. |
| 6,626,541 | B2 | 9/2003 | Sunaga |
| 6,652,104 | B2 | 11/2003 | Nishida et al. |
| 6,752,500 | B1 | 6/2004 | Yoshii et al. |
| 6,768,594 | B2 | 7/2004 | Imafuku et al. |
| 6,788,460 | B2 | 9/2004 | Knox et al. |
| 6,804,055 | B2 | 10/2004 | Peterson et al. |
| 6,805,446 | B2 * | 10/2004 | Arai et al. .................... 353/61 |
| 6,808,271 | B1 | 10/2004 | Kurematsu |
| 6,813,094 | B2 | 11/2004 | Kaminsky et al. |
| 6,853,493 | B2 | 2/2005 | Kreitzer |
| 6,877,862 | B2 | 4/2005 | Fukunaga et al. |
| 6,880,934 | B2 | 4/2005 | Lee |
| 6,883,920 | B2 | 4/2005 | Chen |
| 6,896,375 | B2 * | 5/2005 | Peterson et al. .............. 353/66 |
| 7,080,910 | B2 * | 7/2006 | Engle ......................... 353/119 |
| 7,163,297 | B2 * | 1/2007 | Suzuki et al. ................ 353/77 |
| 2002/0008853 | A1 | 1/2002 | Sunaga |
| 2002/0044263 | A1 | 4/2002 | Takeuchi |
| 2003/0025885 | A1 | 2/2003 | Yajima |
| 2003/0038999 | A1 | 2/2003 | Knox et al. |
| 2003/0053206 | A1 | 3/2003 | Togino |
| 2003/0169513 | A1 | 9/2003 | Kaminsky et al. |
| 2003/0231261 | A1 | 12/2003 | Bassi et al. |
| 2004/0001254 | A1 | 1/2004 | Shimizu |
| 2004/0227990 | A1 | 11/2004 | Peterson et al. |

OTHER PUBLICATIONS

Oulette. "Digital Displays with Micromirror Devices." American Institute of Physics, Jun. 1997. 9-11.

Shinozaki et al. "15.3:a 50-in. Ultra-Slim Liquid-Crystal Rear Projector." SID 92 Digest. Tokyo, Japan: Seiko Epson Corporation, 1992. 273-276.

* cited by examiner

METHOD AND SYSTEM FOR A THERMAL ARCHITECTURE AND USER ADJUSTABLE KEYSTONE IN A DISPLAY DEVICE

CROSS-REFERENCES TO RELATED APPLICATIONS

This application is a divisional of and claims priority to U.S. patent application Ser. No. 10/644,232 filed Aug. 19, 2003 now U.S. Pat. No. 7,080,910 entitled METHOD AND SYSTEM FOR A THERMAL ARCHITECTURE AND USER ADJUSTABLE KEYSTONE IN A DISPLAY DEVICE, which is incorporated herein by reference in its entirety for all purposes.

TECHNICAL FIELD

Embodiments of the invention relate to the field of rear projection display devices, and more specifically to a thermal architecture and user adjustable keystone in a rear projection display device.

BACKGROUND INFORMATION AND DESCRIPTION OF RELATED ART

In order to provide a television with a screen size greater than approximately 40 inches, a display device other than a direct view cathode ray tube (CRT) is typically used. As the screen size of a CRT increases, so too does the depth. It is generally accepted that for screen sizes greater than 40 inches direct view CRTs are no longer practical. Two alternatives exist for large screen (>40 inch screen size) displays: projection displays and plasma displays.

Current plasma displays are much more expensive than projection displays. Plasma displays are generally thin enough to mount on a wall, but can be heavy enough that mounting can be difficult. For example, current 42 inch plasma displays can weigh 80 pounds or more and 60 inch plasma displays can weigh 150 pounds or more. One advantage of plasma displays over current projection displays is that plasma displays are typically much thinner than current projection displays having the same screen size.

Projection displays, specifically rear projection displays, are typically more cost-effective then plasma displays. Projection displays may also consume too much space in a room to provide a practical solution for large screen needs. For example, typical 60 inch rear projection displays are 24 inches thick and can weigh 200 to 300 pounds.

Thin rear projection display devices have been developed that are less than 12 inches thick. However, these thinner rear projection display devices typically rely on an aspherical mirror, which is difficult to manufacture and difficult to align. The difficulties associated with the aspherical mirror results in current thin rear projection displays being expensive, which restricts the availability of rear projection displays in desirable packages.

BRIEF DESCRIPTION OF DRAWINGS

The invention may best be understood by referring to the following description and accompanying drawings that are used to illustrate embodiments of the invention. In the drawings.

DETAILED DESCRIPTION

Embodiments of a system and method for a thermal architecture and user adjustable keystone in a display device is described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
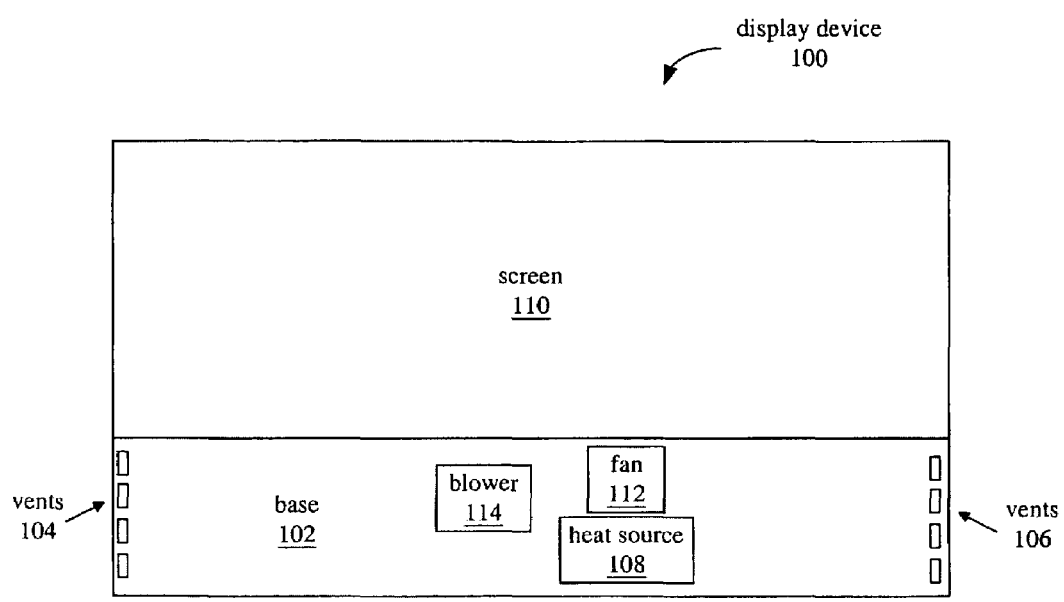
FIG. 1 illustrates a display device according to one embodiment of the invention.

Referring to FIG. 1, a block diagram illustrates a thermal architecture for a rear projection display device 100 according to one embodiment of the invention. Those of ordinary skill in the art will appreciate that the display device 100 may include more components than those shown in FIG. 1. However, it is not necessary that all of these generally conventional components be shown in order to disclose an illustrative embodiment for practicing the invention.

The display device 100 includes a screen 110 and a base 102. The base 102 includes one or more vents, such as 104 and 106, to allow air to flow in and out of the display device. One or more heat sources 108, such as a lamp, generate heat in the display device. In one embodiment, the heat sources are placed away from the screen in the display device. One or more air movement devices, such as fan 112 or blower 114, move air from the heat source away from screen 110 and toward the vents. The air movement devices may also cool the air from the heat sources as they move the air away from the screen and toward the vents.

Figure 2:
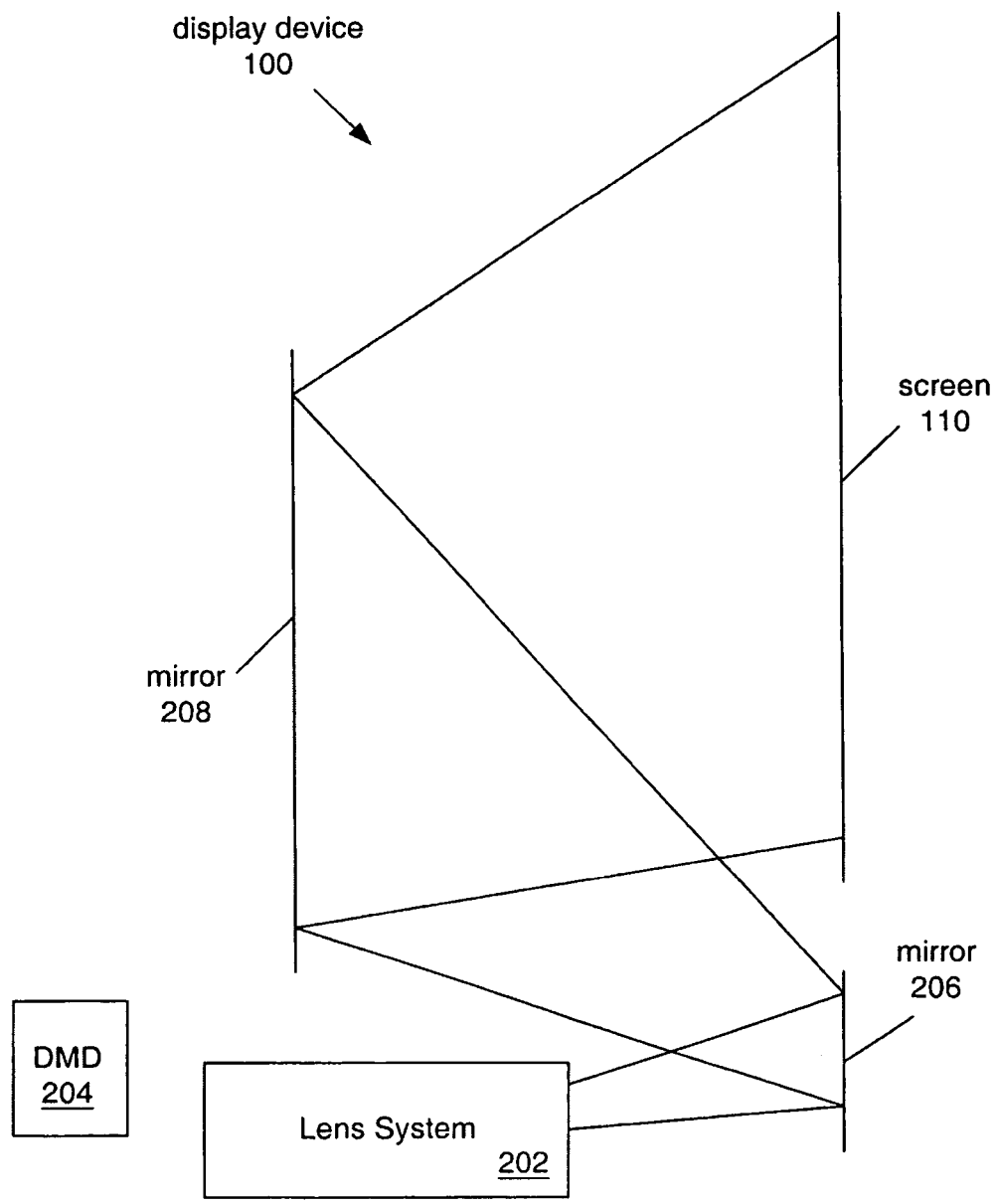
FIG. 2 illustrates a display device with planar mirrors to reflect an image on a screen according to one embodiment of the invention.

FIG. 2 illustrates one embodiment of the display device 100 with planar mirrors to reflect an image on screen 110. In this embodiment, the display device 100 includes a lens system 202, a digital micromirror device (DMD) 204, and a plurality of mirrors, such as 206 and 208, to reflect images on screen 110. Other components, for example, image generating components are not illustrated for reasons of simplicity of description. An image can be provided to DMD 204 in any manner known in the art. DMD 204 selectively reflects light from a light source (not shown in FIG. 2) to lens system 202. Other types of devices, such as microelectromechanical systems (MEMS), grating light valve (GLV), liquid crystal display (LCD), and liquid crystal on silicon (LCOS), can be used to provide an image to lens system 202. In one embodiment, the mirrors are substantially parallel to the screen, which implies an alignment error of +/−10°. In one embodiment, the optic axis of the lens system is substantially perpendicular to the screen, which also implies an alignment error of +/−10°.

In one embodiment, lens system 202 is a wide angle lens system. In general, the wider the angle of lens system 202, the thinner display device 100 can be made. The image from DMD 204 is projected by lens system 202 to mirror 206. Mirror 206 reflects the image to mirror 208, which reflects the image to screen 110. In one embodiment, the screen 110 is a Fresnel lens, for example, a refractive Fresnel lens or a total internal reflection (TIR) Fresnel lens.

Figure 3:
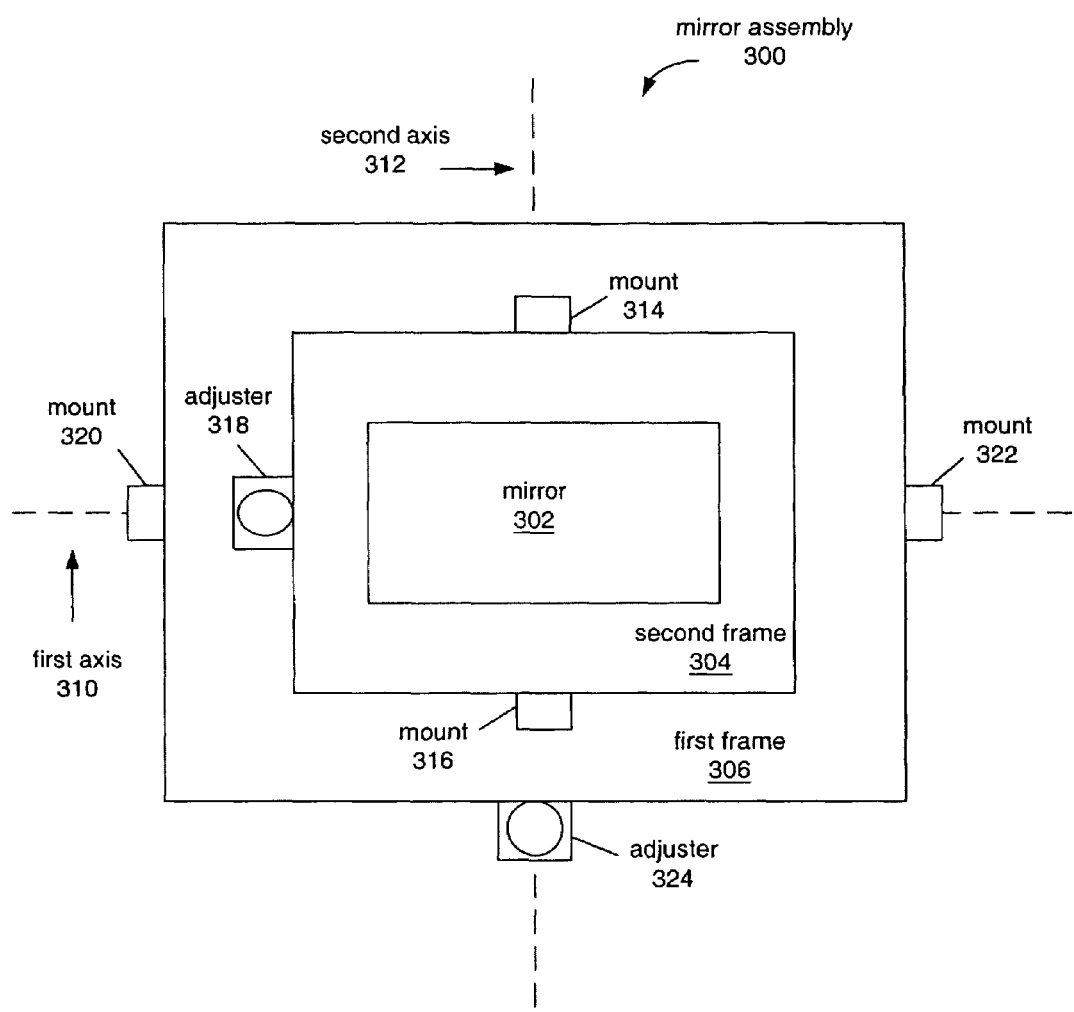
FIG. 3 illustrates a mirror assembly in a display device according to one embodiment of the invention.

FIG. 3 illustrates a mirror assembly 300 in display device 100 according to one embodiment of the invention. Mirror assembly 300 includes a mirror 302 to reflect an image on screen 110, a first frame 306, and a second frame 304. The first frame 306 pivots about a first axis 310. The second frame 304 is pivotably mounted in the first frame 306 to pivot about a second axis 312. In the exemplary embodiment of FIG. 3, the second axis 312 is substantially perpendicular to the first axis 310, which implies an alignment error of +/−10°. In other embodiments, the second axis 312 may be non-perpendicular to the first axis 310.

The mirror 302 is moveably mounted in the second frame 304. The mirror 302 is adapted to pivot about the first axis 310 via the first frame 306 and adapted to pivot about the second axis 312 via the second frame 304. The movement of mirror 302 allows for adjustment of an image reflected by the mirror and projected on screen 110.

The mirror and frames may be mounted using any conventional coupling, such as screws. The mounts 314 and 316 fix the second frame 304 along the second axis 312, allowing the second frame 304 to pivot about the second axis 312 by turning adjuster 318. The mounts 320 and 322 fix the first frame 306 along the first axis 310, allowing the first frame 306 to pivot about the first axis 310 by turning adjuster 324. In one embodiment, adjusters 318 and 324 are screws. In one embodiment, each adjuster includes a screw and a knob coupled to the screw for easier adjustment. By turning the knob, the screw loosens or tightens to adjust the angle of the pivot of mirror 302. This adjusts the image reflected by the mirror and projected on screen 110.

Figure 4:
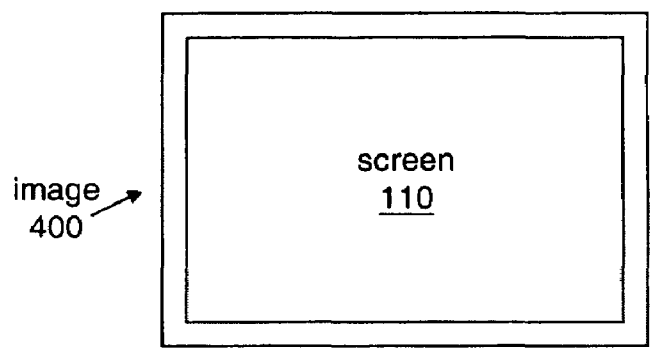
FIG. 4 illustrates a centered image projected on a screen of a display device according to one embodiment of the invention.
Figure 5A:
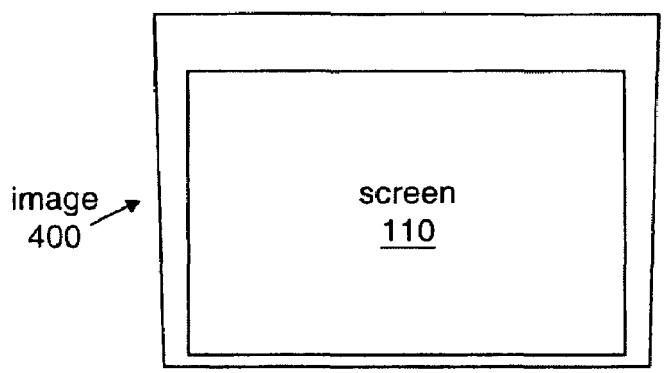
FIG. 5a illustrates an upward-adjusted image projected on a screen of a display device according to one embodiment of the invention.

FIG. 4 illustrates an image 400 projected on the screen 110 of the display device 100 according to one embodiment of the invention. The image is overscanned slightly around screen 110. The image shown in FIG. 4 has been adjusted to be centered on the screen 110. Suppose the adjuster 324 is turned to the right. In one embodiment, this causes the first frame 306 to pivot upward about the first axis 310. This adjusts the angle of the mirror 302, causing the image to be adjusted on the screen 110. One example of an image resulting from this type of adjustment is shown in FIG. 5*a*. The image in this example has been adjusted by pivoting the first frame 0.5 degrees upward about the first axis.

Figure 5B:
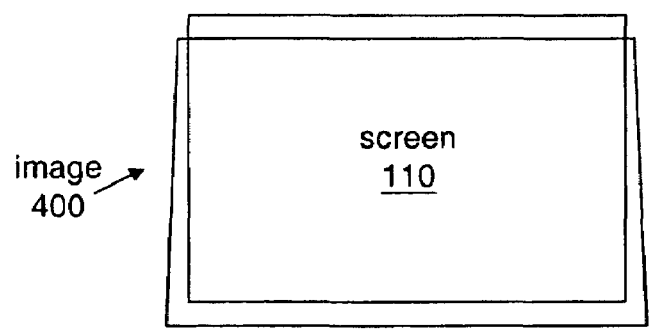
FIG. 5b illustrates a downward-adjusted image projected on a screen of a display device according to one embodiment of the invention.

Suppose the adjuster 324 is turned to the left. In one embodiment, this causes the first frame 306 to pivot downward about the first axis 310. One example of an image resulting from this type of adjustment is shown in FIG. 5*b*. The image in this example has been adjusted by pivoting the first frame 0.5 degrees downward about the first axis.

Figure 6A:
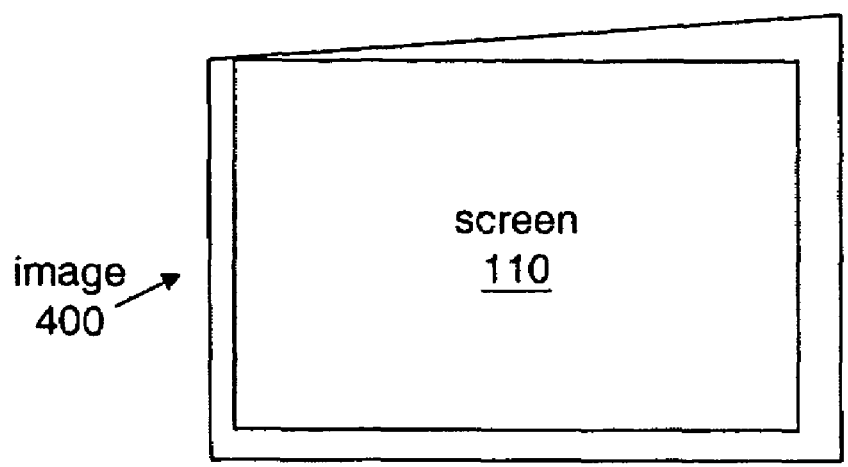
FIG. 6a illustrates a rightward-adjusted image projected on a screen of a display device according to one embodiment of the invention.

Suppose the adjuster 318 is turned to the right. In one embodiment, this causes the second frame 304 to pivot to the right about the second axis 312. One example of an image resulting from this type of adjustment is shown in FIG. 6*a*. The image in this example has been adjusted by pivoting the second frame 0.35 degrees to the right about the second axis.

Figure 6B:
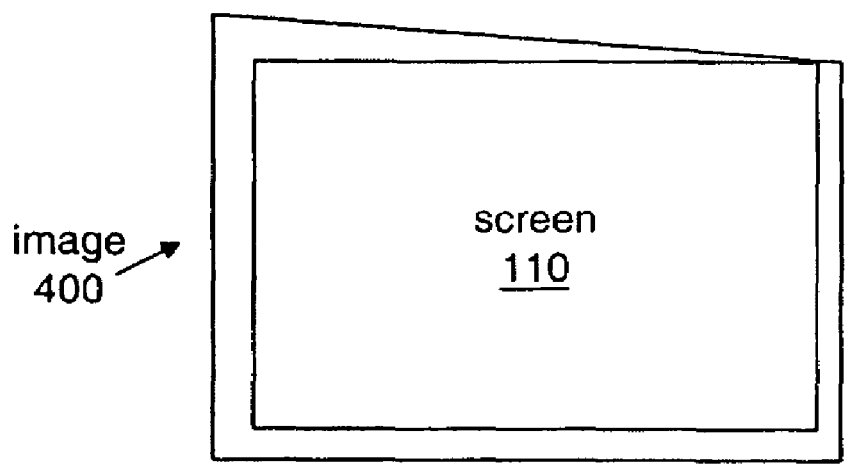
FIG. 6b illustrates a leftward-adjusted image projected on a screen of a display device according to one embodiment of the invention.

Suppose the adjuster 318 is turned to the left. In one embodiment, this causes the second frame 304 to pivot to the left about the second axis 312. One example of an image resulting from this type of adjustment is shown in FIG. 6*b*. The image in this example has been adjusted by pivoting the second frame 0.35 degrees to the left about the second axis.

The adjusters 324 and 318 may be turned to pivot the mirror at various angles about the first axis and the second axis. By tilting the mirror at different angles, the image is reflected at different angles on the screen. This allows for easy user adjustment of the image on the screen.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A rear projection display device comprising:
   a screen;
   a first frame selectively pivotal about a first axis through a first adjuster;
   a second frame selectively pivotal about a second axis through a second adjuster;
   a mirror to reflect an image to the screen, the mirror moveably mounted to the second frame and adapted to pivot about the first axis and the second axis, wherein a user may selectively position the image on the screen through use of the first adjuster and the second adjuster; and
   a base to which the screen is mounted, the base including:
      a plurality of vents to allow air to flow in and out of the base;
      a heat source; and
      an air movement device to move air from near the screen, past the heat source, and out through the vents.

2. The display device of claim 1, wherein the air movement device is a fan.

3. The display device of claim 1, wherein the air movement device is a blower.

4. The display device of claim 1, wherein the heat source is a lamp.

5. The display device of claim 1, further comprising a wide angle lens system to project an image.

6. The display device of claim 1, further comprising a first mirror to reflect the image to the screen.

7. The display device of claim 6, further comprising an intermediate mirror to reflect the image projected by the lens system to the first mirror.

8. The display device of claim 5, further comprising a digital micromirror device (DMD) to provide the image to the lens system.

9. The display device of claim 5, further comprising a microelectromechanical system (MEMS) to provide the images to the lens system.

10. The display device of claim 5, further comprising a grating light valve (GLV) to provide the images to the lens system.

11. The display device of claim 5, further comprising a liquid crystal display (LCD) to provide the images to the lens system.

12. The display device of claim 5, further comprising a liquid crystal on silicon (LCOS) display to provide the images to the lens system.

13. The display device of claim 1, wherein the screen comprises a total internal reflection (TIR) Fresnel lens.

14. The display device of claim 1, wherein the screen comprises a refractive Fresnel lens.

15. The display device of claim 1, wherein the air movement device is positioned lower than a bottom edge of the screen.

16. A rear projection display device comprising:
   a screen bordered by a top edge, a bottom edge, a left edge and a right edge;
   a first frame selectively pivotal about a first axis through a first adjuster;
   a second frame selectively pivotal about a second axis through a second adjuster;
   a mirror to reflect an image to the screen, the mirror moveably mounted to the second frame and adapted to pivot about the first axis and the second axis, wherein a user may selectively position the image on the screen through use of the first adjuster and the second adjuster; and
   a base to which the screen is mounted, the base including:
      a plurality of vents to allow air to flow out of the base;
      a heat source; and
      an air movement device to move air past the heat source and out through the vents, wherein the air movement device is positioned lower than the bottom edge of the screen.

17. A rear projection display device comprising:
   a screen;
   a first frame selectively pivotal about a first axis through a first adjuster;
   a second frame selectively pivotal about a second axis through a second adjuster;
   a mirror to reflect an image to the screen, the mirror moveably mounted to the second frame and adapted to pivot about the first axis and the second axis, wherein a user may selectively position the image on the screen through use of the first adjuster and the second adjuster; and
   a base to which the screen is mounted, the base including:
      a plurality of vents to allow air to flow out of the base;
      a heat source; and
      a plurality of air movement devices to move air from near the screen past the heat source and out through the vents.

* * * * *